Dec. 20, 1927.
E. G. GARTIN
1,653,268
DRILLING MECHANISM
Filed March 24, 1927
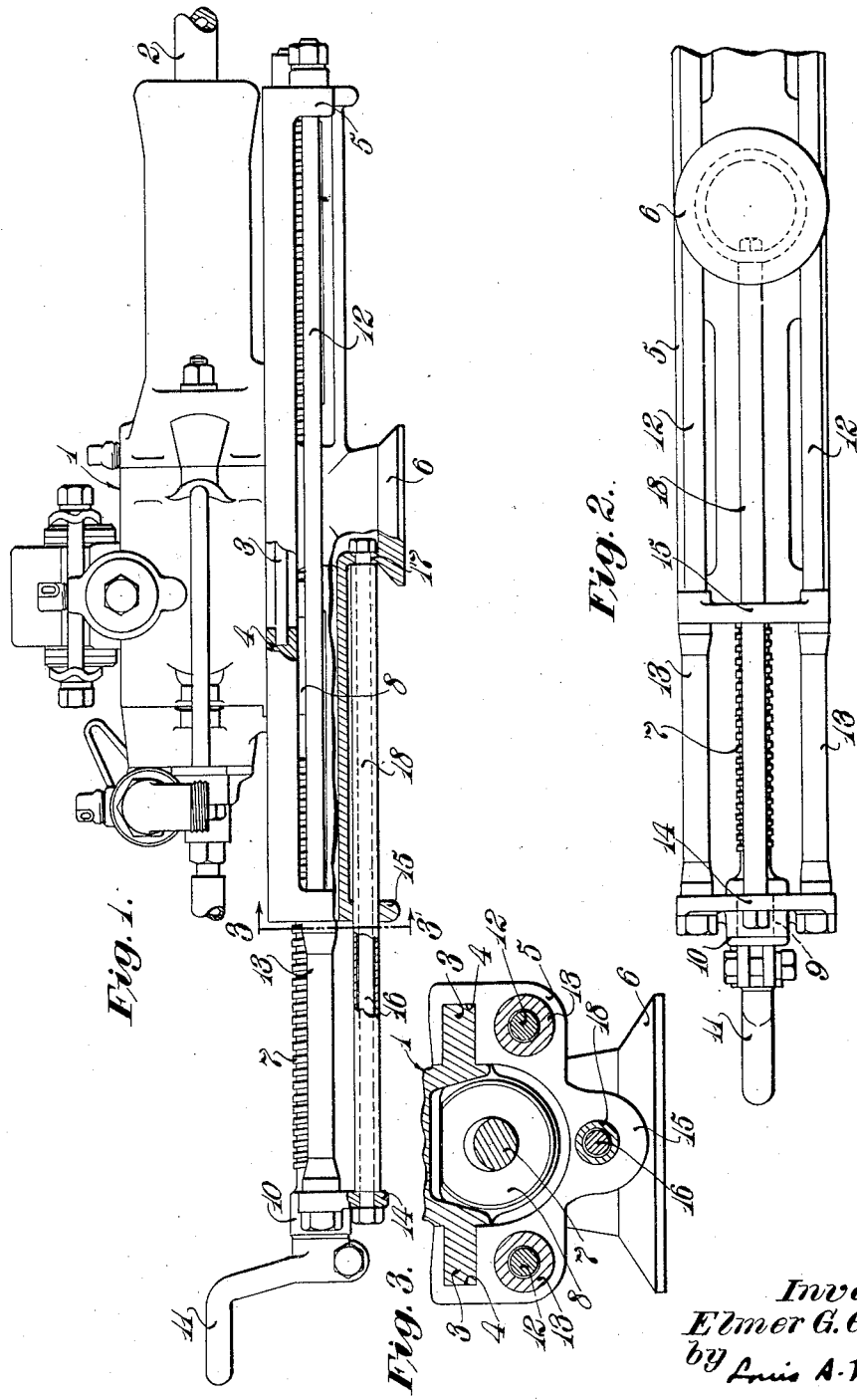
Inventor:
Elmer G. Gartin.
by Louis A. Maxson.
Att'y.

Patented Dec. 20, 1927.

1,653,268

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

DRILLING MECHANISM.

Application filed March 24, 1927. Serial No. 178,108.

This invention relates to drilling mechanisms, and more particularly to mounted rock drills of the hammer type having improved means for supporting the mounting of the feed screw and the guide shell so that the same are made more rigid and elimination of vibration to a very material degree is attained.

In a rock drill of the so-called drifter type the drilling motor is slidably guided on a guide shell and a manually rotatable feed screw is provided for feeding the drilling motor relative to the shell. In such drills it has been found that with a modern powerful machine considerable vibration of an objectionable character is transmitted to the operating handle of the feed screw, thereby making it exceedingly annoying and fatiguing for the operator feeding the drill.

An object of this invention is to provide improved means for overcoming this difficulty, this means rigidly bracing the feed screw support and the guide shell, thereby reducing vibration to a minimum. Another object is to provide an improved bracing means between the rear feed screw support and the guiding shell. Still another object is to provide improved bracing means extending between the supporting trunnion or swivel plate for the guiding shell and the rear feed screw support. These and other objects and advantages of this invention will however subsequently more fully appear.

In the accompanying drawing there is shown for purposes of illustration one form which the invention may assume in practice.

In this drawing,—

Fig. 1 is a side elevational view of a drilling apparatus with which the improved bracing means is incorporated, parts being shown in section to illustrate details of construction.

Fig. 2 is a fragmentary bottom plan view of the drill shown in Fig. 1.

Fig. 3 is a transverse vertical sectional view taken on line 3—3 of Fig. 1.

In this illustrative construction there is shown a drilling tool generally designated 1 of the well known pressure fluid actuated, hammer type having a usual reciprocable hammer piston adapted to strike blows on the shank of a drill steel 2 suitably carried within the forward end of the tool. As shown, the tool 1 has lateral gibs 3 slidably mounted in parallel longitudinally extending guideways 4 carried by a guiding shell 5 of standard construction. The shell 5 has a usual hollow swivel supporting plate or trunnion 6 at the bottom thereof and intermediate its ends on which the machine is adapted to be supported. For instance, the trunnion 6 may be clamped on a suitable tripod or column. Rotatably mounted on the shell 5 and extending longitudinally thereof is a feed screw 7 adapted to cooperate with a usual non-rotatable feed nut 8 suitably carried by the drilling tool 1. The feed screw 7 is rotatably mounted at its rear end at 9 within a transverse supporting member or yoke 10 and carries at its rear end a manual grasping handle or crank 11 by means of which the feed screw can be rotated. The yoke 10 is supported on parallel side rods or bolts 12 extending longitudinally of the shell 5 at the opposite sides thereof, suitable spacing sleeves 13 through which the bolts extend being interposed between the yoke 10 and the rear end of the shell 5. The sleeves 13 and the rearwardly extending portions of the bolts 12 extend rearwardly of the shell 5 and form a rearward extension for the latter. The above construction is usual in rock drills of the type disclosed.

In the improved construction it will be herein observed that the transverse yoke 10 has preferably formed integral therewith a depending perforated boss 14 while the rear end of the shell 5 has a similar depending boss 15. Extending longitudinally of the shell 5 immediately below the feed screw 7 and equidistant from the side bolts 12 is a bolt 16 extending through the openings in the bosses 14 and 15 and an opening 17 formed in the rear side of the trunnion 6. In accordance with this illustrative embodiment of the invention the bolt 16 extends through a spacing sleeve 18 having its ends abutting the yoke 10 and the trunnion 6 respectively. This bolt rigidly clamps the spacing sleeve 18 in position, thereby forming an exceedingly stable and rigid bracing means for the rear end of the feed screw 7 and the shell 5. It has been found that with this construction the rear yoke 10 and the shell 5 are more firmly supported and vibration set up by the drilling motor is substantially reduced, thus holding the handle and the rear feed screw bearing so that the handle can be more agreeably operated. From the foregoing it is thought that the construction, operation, and the plural advantages of the herein described invention will be clearly apparent to those skilled in this art, without further description.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drilling mechanism, a guiding shell having a supporting trunnion, a drilling tool slidably mounted thereon, spaced supporting elements carried by said shell and extending rearwardly thereof, a yoke carried by said supporting elements, a feed screw for moving the drilling tool relative to said shell journaled on said yoke, and bracing means extending between said yoke and said trunnion at one side of said feed screw.

2. In a drilling mechanism, a guiding shell having a supporting trunnion, a drilling tool slidably mounted thereon, side bolts carried by said shell and extending rearwardly thereof, a yoke carried by said side bolts, a feed screw for moving the drilling tool relative to said shell journaled on said yoke, and a bracing bolt extending between said yoke and said trunnion below said feed screw.

3. In a drilling mechanism, a guiding shell having a supporting trunnion, a drilling tool slidably mounted thereon, side bolts carried by said shell and extending rearwardly thereof, a yoke carried by said side bolts, a feed screw for moving the drilling tool relative to said shell journaled on said yoke, a bracing bolt extending between said yoke and said trunnion below said feed screw, and a spacing sleeve through which said bolt extends having its ends abutting said yoke and trunnion.

4. In a drilling mechanism, a guiding shell having a supporting trunnion, a drilling tool slidably mounted thereon, spaced supporting elements carried by said shell and extending rearwardly thereof, a yoke carried by said supporting elements, a feed screw for moving the drilling tool relative to said shell journaled on said yoke, and bracing means extending between said yoke and said trunnion at one side of said feed screw and generally longitudinally of the same and the spaced supporting elements.

5. In a drilling mechanism, a guiding shell having a supporting trunnion, a drilling tool slidably mounted on said shell, side bolts carried by said shell and extending rearwardly thereof, a yoke carried by said side bolts, a feed screw for moving the drilling tool relative to said shell journaled on said yoke, a perforated boss depending from the rear end of said shell, and a tie bolt connecting said yoke and trunnion and passing through said depending boss.

6. In a drilling mechanism, a guiding shell having a supporting trunnion, a drilling tool slidably mounted on said shell, a pair of side bolts carried by said shell and extending rearwardly thereof, a yoke carried by said side bolts and having a depending perforated boss, a feed screw for moving the drilling tool relative to said shell journaled on said yoke, a depending perforated boss on the rear end of said shell, and a third bolt disposed below said feed screw and extending from the boss on said yoke and through said trunnion and passing through the boss on said shell.

7. In a drilling mechanism, a guiding shell having a supporting trunnion, a drilling tool slidably mounted on said shell, a pair of side bolts carried by said shell and extending rearwardly thereof, a yoke carried by said side bolts and having a depending perforated boss, a feed screw for moving the drilling tool relative to said shell journaled on said yoke, a depending perforated boss on the rear end of said shell, and a third bolt connecting said yoke and trunnion and a spacing sleeve through which said third bolt extends having its ends abutting the boss on said yoke and said trunnion respectively, said sleeve passing through the boss on said shell.

In testimony whereof I affix my signature.

ELMER G. GARTIN.